Feb. 22, 1949.   C. H. ZIMMERMAN ET AL   2,462,824
SINGLE OR MULTIENGINED DRIVE FOR PLURAL AIRSCREWS
Filed Nov. 3, 1944   3 Sheets-Sheet 1

INVENTOR
Charles H. Zimmerman
and Henry J. Rapuano
BY M. B. Tasker
ATTORNEY

Feb. 22, 1949.  C. H. ZIMMERMAN ET AL  2,462,824
SINGLE OR MULTIENGINED DRIVE FOR PLURAL AIRSCREWS
Filed Nov. 3, 1944  3 Sheets-Sheet 2

INVENTORS
*Charles H. Zimmerman
and Henry J. Rapuano*
BY
ATTORNEY

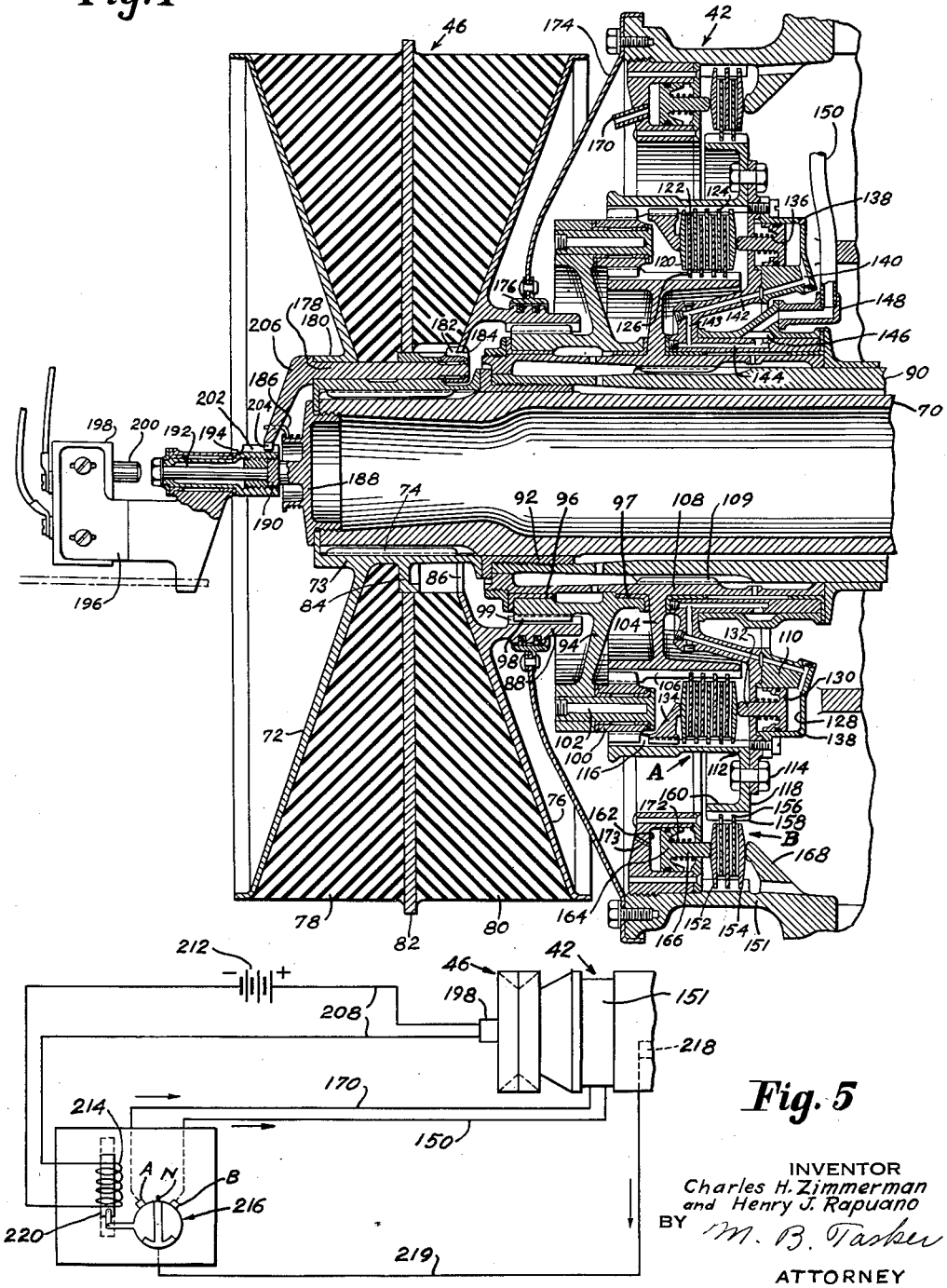

Patented Feb. 22, 1949

2,462,824

UNITED STATES PATENT OFFICE 2,462,824

SINGLE OR MULTIENGINED DRIVE FOR PLURAL AIRSCREWS

Charles H. Zimmerman, Nichols, and Henry J. Rapuano, Milford, Conn., assignors to United Aircraft Corporation, East Hartford, Conn., a corporation of Delaware Application November 3, 1944, Serial No. 561,811

14 Claims. (Cl. 244—60)

1

This invention relates to aircraft propulsion and particularly to a propeller drive system for aircraft in which the driving power is supplied by a plurality of engines driving a plurality of interconnected propellers.

An object of the invention is to provide improved means for driving two propellers from two engines, by which either engine or both engines can be disconnected from the drive system by the pilot, and by which either engine will be immediately disconnected from the system automatically upon failure of that engine.

Another object of the invention is to provide an improved and simplified propeller drive system of this general type comprising two interconnected engine-propeller units in which two propellers are rotated in opposite directions and at equal speeds by two like rotating engines.

A further object of the invention is to provide an improved driving system of this general type having improved change speed gearing between each engine and the remainder of the system and having improved operating mechanism by which a change of gearing can be made instantly without the necessity of throttling the engines or disconnecting them from the system.

A further object of the invention is to provide an improved multi-engine, multi-propeller driving system for a low aspect ratio all wing airplane; and more specifically to provide an improved two-engine drive for two widely spaced propellers at the forward lateral extremities of such an airplane in which the axes of the engines and their transmission means are disposed parallel and the transmission means and the propellers are connected by shafting disposed at right angles to these axes.

A still further object of the invention is to provide improved means for damping torsional oscillations emanating from the engines.

A further object of the invention is to provide improved power transmission means between each engine and the remainder of the drive system including improved engine disconnecting means and control means therefor.

A further important object of the invention is to provide means for releasably connecting the input and output shafts of the engine transmission means including planetary gearing and partial torque clutch means arranged to transmit the engine power in parallel paths.

A yet further object of the invention is to provide transmission means of the above type having change speed gearing controlled by a plurality of clutch means, and pilot operated means for

2 controlling said clutch means to govern gear changes as well as the connection and disconnection of said engines.

Other objects and advantages of the invention will be evident from the specification and from the accompanying drawings which illustrate a preferred embodiment of the invention.

In the drawings,

Fig. 4 is an enlarged sectional view through a portion of the transmission means of Fig 3 showing the change speed gearing and flexible coupling, and Fig. 5 is a schematic wiring diagram illustrating a selector valve for pilot control of the change gear mechanism and the circuit for automatic control thereof to disconnect a faulty engine.

As herein shown, the invention is embodied in a low aspect ratio, all wing airplane 10 having a pilot compartment 12 centrally located in the forward portion of the wing, two propeller nacelles 14 and 16 projecting forwardly of the wing at the lateral extremities thereof, and two engine nacelles 18 and 20 located in the wing between the pilot compartment and each propeller nacelle.

Figure 2:
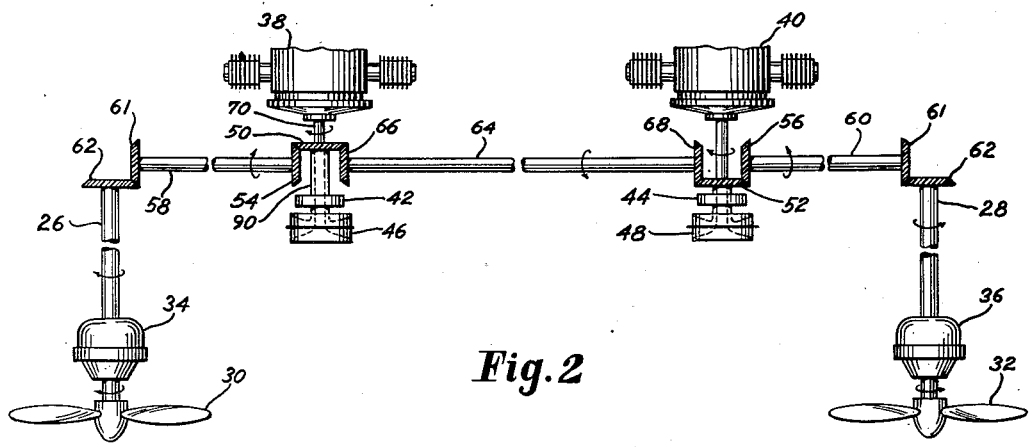
Fig. 2 is a schematic view showing the interconnection of the engine-propeller units by which like rotating engines produce oppositely rotating propellers.

The propeller nacelles have propeller driving means including right-angle-drive gear boxes 22, 24 and propeller drive shafts 26 and 28 for driving propellers 30 and 32 through usual reduction gearing 34, 36 (Fig. 2).

Figure 1:
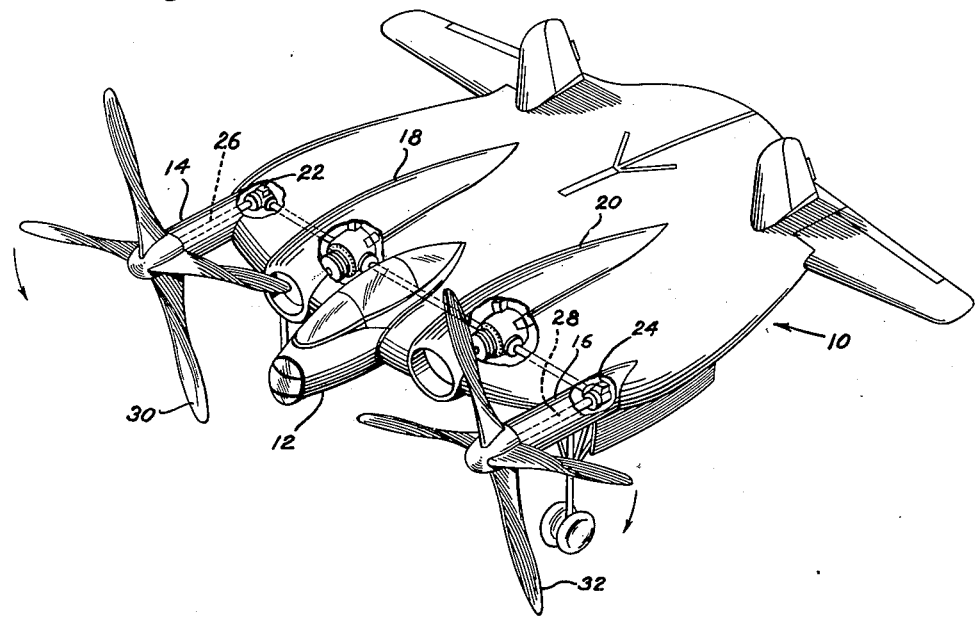
Fig. 1 is a perspective view of a low aspect ratio all wing airplane having the improved propeller drive system of the invention.

The propellers are driven by two engines 38, 40 which may be of any type suitable for aircraft propulsion and which are herein diagrammatically illustrated as identical engines of the radial cylinder, aircooled type. As shown in Fig. 1, these engines are mounted in the engine nacelles 18 and 20 close to the leading edge of the wing and have their axes of rotation parallel with the propeller drive shafts 26 and 28. Improved transmission means are provided at the forward ends of said engines which include, as is shown diagrammatically in Fig. 2, coaxially arranged change speed gearing 42, 44 and flexible coupling means 46, 48 for the respective engines.

The transmission means of engines 38 and 40 are connected to propeller drive shafts 26 and 28 by means of bevel gears 50 and 52 meshing with bevel gears 54 and 56 on transverse shafts 58 and 60 which extend into the gear boxes 22 and 24. Bevel gears 61 and 62 are provided in each of these right angle gear boxes for connecting the shafts 58 and 60 to the propeller drive shafts 26 and 28. The two engine propeller units above described are inter-connected by a transverse shaft 64 having bevel gears 66 and 68 meshing with the bevel gears 50 and 52 of the respective engine transmission means.

It will be noted that the transverse shafts 58, 60 and 64 are connected to the rear of the transmission means between the latter and the engines and that the driving gears 50 and 52 of the transmission means are connected to the confronting pairs of bevel gears on these transverse shafts fore and aft thereof for the respective engines so that while both engines 38 and 40 rotate in the same direction, as indicated by the arrows in Fig. 2, as a result of the arrangement of the bevel gears shown in this figure shafts 58 and 60 rotate in the same direction and propeller shafts 26 and 28 and propellers 30 and 32 driven thereby rotate in opposite directions.

Aside from the differences above pointed out in the bevel gear connections between the transmission means of the two engines, these transmission means are identical and accordingly only one will be described in detail in connection with the engine 38.

Figure 3:
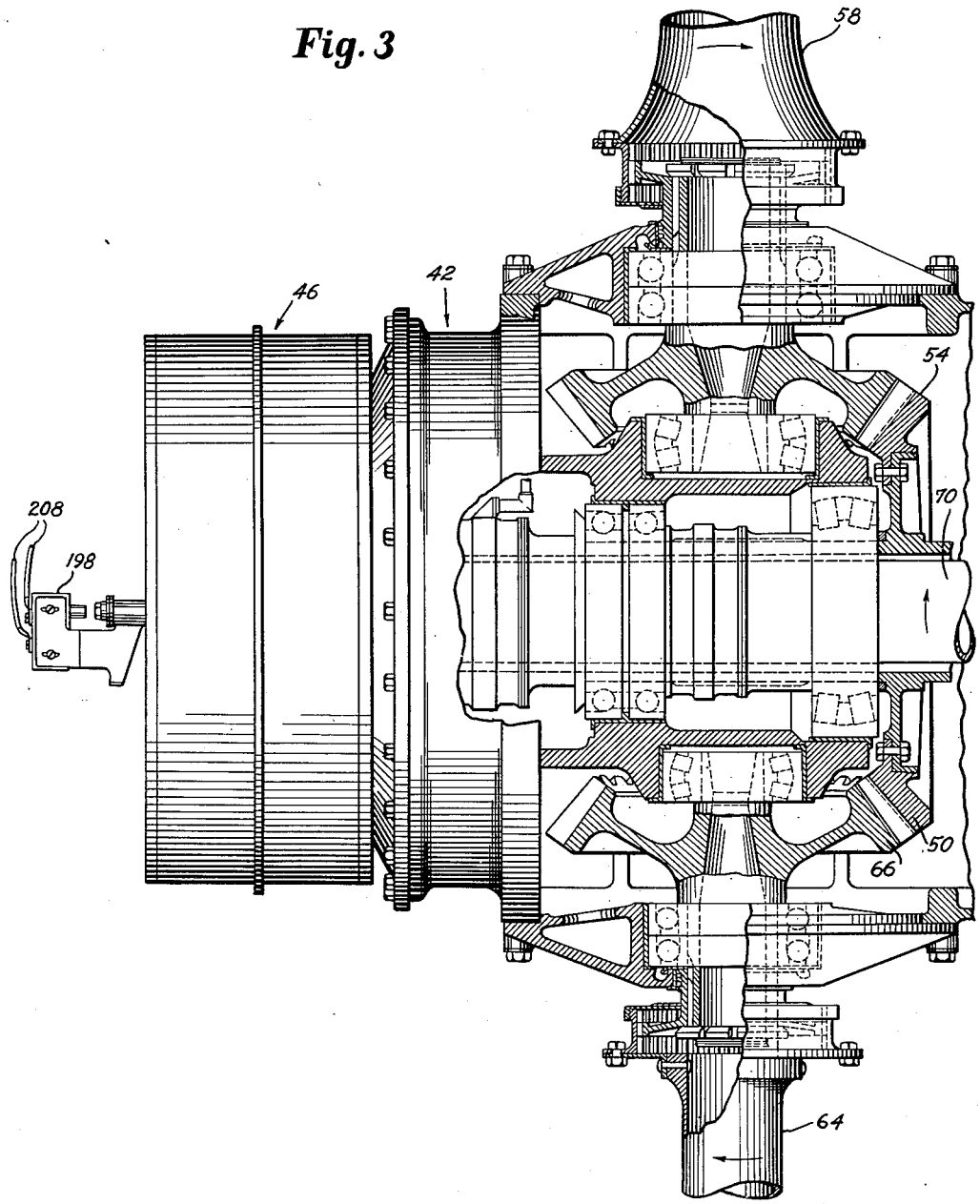
Fig. 3 is a view on an enlarged scale of the transmission means of one engine, parts of the casing being broken away.

As shown in Figs. 3 and 4, engine 38 drives a shaft 70 which extends forward beyond the axis of the aligned transverse shafts 58, 64 and axially through the change speed gearing 42 ad coupling 46. This shaft, which is the power input shaft of the transmission means, carries as its forward end an outwardly and forwardly flared flange 72 of said coupling 46 which has a hub 73 connected to the shaft 70 by a spline 74. The flange 72 is connected to a similar but outwardly and rearwardly flared flange 76 by resilient bodies of rubber 78 and 80, preferably bonded thereto and also bonded to an intermediate guiding plate 82 which is rotatably supported on a flange 84 integral with the coupling sleeve 73. It will be noted that the flange member 76 has an enlarged axial aperture 86 which spaces its inner periphery from the hub 73 so that this flange member is supported on the rubber body 80 free from the hub 73. The flange member 76 has a rearwardly directed annular flange 88 which is connected to and drives the change speed gearing which will now be described.

An outer shaft 90 concentric with shaft 70 constitutes the power output shaft of the transmission means and is rotatably mounted on shaft 70, the forward bearing therefor compirsing a thimble 92 which is threaded into the end of shaft 90 and abuts the sleeve 73 of the coupling. A planetary pinion carrier 94 is journalled on member 108 on spaced bushings 96 and 97 and has external splines 98 which mesh with corresponding internal splines 99 on flange 88 of the free coupling flange member 76. A plurality of planetary pinions 100 are rotatably mounted on spindles 102 of said carrier and mesh with a sun gear 104 having elongated teeth 106 and an elongated hub 108 which is splined at 109 to output shaft 90. An intermediate gear member 110 is rotatably mounted on the elongated hub 108 of sun gear 104 and has a ring gear 112 secured thereto by a series of bolts 114. The ring gear 112 has elongated teeth 116 coextensive with teeth 106 on the sun gear which mesh at their forward ends with the planetary pinions 100 on the carrier 94.

The teeth 116 and 106 of said ring gear and said sun gear respectively are releasably connected by a clutch generally indicated by the letter "A" comprising alternately arranged sets of clutch plates or rings 120, 122 which occupy the annular space between said teeth and are connected thereto by teeth 124 on the external periphery of plates 120 and by similar teeth 126 on the internal periphery of plates 122.

Hydraulic means are provided for controlling the engagement of the clutch A including an annular hydraulic cylinder 128 and a cooperating annular piston 130. The piston is provided with a plurality of peripherally spaced piston rods 132 which engage the rearmost clutch plate of clutch A and, when hydraulic fluid is supplied to the cylinder, press those plates together against an annular abutment 134 which has external teeth meshing with the teeth 116 on ring gear 104. A plurality of springs 136 on the piston rods 132 constantly bias the piston 130 into a clutch releasing position. Such releasing movement of the piston is made possible by two restricted vents 138 in cylinder 128 which allow the gradual escape of hydraulic fluid from the cylinder due both to the pressure of the springs 136 and the centrifugal forces due to the rotation of the cylinder.

Fluid under pressure is supplied to the rotating cylinder 128 through suitable passages 140, 142, 143, 144 and an annular passage 146 formed in a stationary manifold 148 supplied by pipe 150.

Means are provided for releasably locking the ring gear 112 to the enclosing casing 151. This means includes a brake generally indicated by the letter "B," similar to the clutch A above described, having one set of plates 152 meshing with the internal teeth 154 on the casing and another set of plates 156 meshing with the teeth 158 formed on a flange 160 on the ring gear 112. The engagement of the brake B is controlled by a stationary annular hydraulic cylinder 162 carried by the casing 151 and an annular piston 164 carrying piston rods 166 for pressing the plates 152, 156 against an abutment 168 formed on the housing 151. Fuid is supplied to the cylinder 162 through supply pipes 170, one of which is shown in the upper portion of Fig. 4. The piston 164 is biased into brake releasing position by a plurality of springs 172 surrounding the piston rods 166. Suitable vent passages 173 are provided in the cylinder 162 similar to the passage 138 above described.

The flange 88 of coupling member 76 is supported by an annular apron 174 carried by the casing 151 and having a shoe 176 carrying suitable sealing means which engage the external periphery of sleeve 88.

The above described change gear mechanism, the operation of which will be hereinafter more fully explained, provides means for obtaining two different gear ratios between shafts 70 and 90 and also provides means for disconnecting the drive between these two shafts at the will of the pilot.

Means are also provided for automatically disconnecting the drive between shafts 70 and 90 upon failure of the engine. This is accomplished by electric switch operating mechanism responsive to reversal of torque in the coupling 46. To this end a stub shaft 178 is journalled in a thickened portion 180 of coupling hub 73 and is formed with an upstanding detent, or tooth, 182 disposed between two spaced depending abutment surfaces 184 on flange 76, one of which is shown in Fig. 4. The space between the surfaces 184 is such that upon failure of engine 38 to develop its normal torque with the other engine 40 connected to the system, the tooth 182 will be engaged to rock the shaft 178 against the bias of a spring 186 to actuate the switch mechanism.

The switch mechanism is supported on a cap 188 which is screw threaded into the end of the engine driven shaft 70. The cap is provided with an integral forwardly extending, coarsely threaded hub 190 terminating in a stud 192. Stud 192 and the hub 190 support an annular coarsely threaded sleeve 194 carrying a bracket 196 which is suitably journalled on the sleeve so that the rotation of the sleeve is not transmitted to the bracket. The bracket supports a micro-switch 198 having a switch actuating plunger 200 aligned with the stud 192. The rear end of the sleeve 194 is provided with elongated gear teeth 204 meshing with a segment gear 206 formed integral with the stub shaft 178. By this arrangement a reversal in the windup of coupling 46 results in rotation of sleeve 194 on hub 190 and axial movement of this sleeve on the threaded plug 190 to move plunger 200 against the extremity of stud 192 to actuate the switch 198. This switch and the mechanism for actuating it upon reversal of torque in the engine drive is more fully described and is claimed in our copending United States application Serial No. 561,812, filed November 3, 1944.

The switch 198 is connected in a solenoid circuit 208 energized by a battery 212. The solenoid 214 is adapted to be energized whenever the switch 198 is closed to operate a hydraulic selector valve 216 which controls the supply of fluid from high pressure source 218 to clutch A and brake B. As diagrammatically shown in Fig. 5, the selector valve can be operated to admit high pressure fluid from source 218 which may be a pump, through conduit 219 to valve 216 and thence through conduit 150 to clutch A or through conduit 170 to brake B to provide different speed ratios as will hereinafter be explained. The selector switch 216 can also be moved to an intermediate position "N" in which the fluid supply to both clutch A and brake B is cut off to disconnect the engine from the system.

In Fig. 5 the selector switch is shown in the position "N" mid-way between its "A" and "B" positions in which fluid is supplied to clutch A and brake B respectively. In this mid-position the core 220 of solenoid 214, which is carried by the movable element of selector valve 216, is centrally located in the winding 214. When the selector switch occupies either position "A" or "B" the core 220 is moved out of this central position as shown in dotted lines in Fig. 5.

The operation of the engine-propeller drive system is as follows: With the selector valves 216 of both engines 38 and 40 in the "N" or mid-position, as shown in Fig. 5, both clutch A and brake B of the engine transmission means of both engines will be disengaged, since no fluid is being supplied to cylinders 128 and 162 thereof. Under these conditions any fluid in these cylinders will have been discharged into the interior of casing 151 through the vents 138 and 173 under the action of springs 136 and 172. Accordingly the engines can be operated free from the propellers during servicing or warming up operations.

In taking off, when the airplane speed is low, it is desirable to operate the propellers at a higher R. P. M. than would be desirable at cruising speeds. With the improved transmission means of the present invention this is accomplished by moving the selector valves 216 of both engines manually to position "B" (Fig. 5) to supply high pressure fluid from source 218 to brakes B only. This results in locking the ring gear 112 to the casing 151. Since clutch A of each transmission means is disengaged, the shaft 90 thereof will be driven at a higher rate of speed than the driving shaft 70 due to the planetary movement of the planetary gearing. Here it will be understood that, in addition to the rotation of the sun gear 104 due to the bodily movement of the planetary pinions about the axis of the sun gear, the latter gear is additionally rotated due to the engagement of these pinions with ring gear 112 and the resultant rotation of these planetary pinions about their own axes. When it is desired to cruise and this over-drive is no longer desired, the selector valves 216 are moved by the pilot to position "A" in which fluid to brakes B is cut off and fluid is supplied to clutches A. The ring gear 112 is now rigidly connected to the sun gear 104 and rotates therewith, the whole planetary gearing rotating bodily about the axis of the sun gear 104 and providing a one to one drive ratio between the shafts 70 and 90.

It will be noted that during cruising the driving torque between the ring gear 112 and the sun gear 104 is transmitted through two parallel paths, one of which comprises the pinions of the planetary gearing and the other of which comprises the clutch plates of clutch A, so that the clutch is required to transmit only part of the total driving torque.

It will thus be evident that the pilot by moving the selector valves 216 can shift both engines into either the high or the low drive ratio or into a neutral engine-disconnected position.

Also with the engines connected to the propellers in either high or low speed ratio a faulty engine will be automatically disconnected from the system upon failure to develop a predetermined torque. If the plane is cruising and engine 38 stops, the reversal of the wind-up of coupling 46 will close the switch 198 associated with engine 38 and cause the solenoid winding 214 to be energized from the battery 212. The core 220 will be attracted into a central position in the winding 214 to disconnect the faulty engine.

It will be evident that as a result of this invention an improved construction and arrangement of multi-engine-propeller drive has been provided including an improved change-speed gearing and improved control means therefor enabling the pilot to disconnect either or both engines and also to change the gear ratio of the engine transmission means at will without throttling or disconnecting the engines.

It will also be evident that improved automatic engine de-clutching means has been provided for disconnecting a faulty engine upon a predetermined reduction in driving torque developed thereby.

Also as a result of this invention means has been provided for controlling the connection between the input and output shafts of an engine transmission means including a clutch which is required to transmit only part of the driving torque of the engine with which it is associated, thus enabling the clutch to be smaller and lighter while still effectively controlling the connection.

As a further result of the invention an improved arrangement of engine transmission means and propeller interconnecting drive shafts has been provided which is simple and compact and which is particularly adapted for driving the oppositely rotating propellers of a low aspect ratio all wing airplane.

While the invention has been described with particular reference to one illustrative embodiment, it will be evident that many changes may be made in the construction and arrangement of the parts illustrated without departing from the scope of the invention as defined by the following claims.

We claim:

1. In a power transmission mechanism, driving and driven members, a sun gear connected to one of said members, an internal ring gear rotatable about the axis of said sun gear, a planetary pinion meshing with said sun and ring gears and a carrier therefor connected to the other of said members, means for rotating said sun gear, ring gear and planetary pinion as a unit about the axis of said sun gear including clutch mechanism disposed around the axis of said sun gear having sets of cooperating annular friction clutch rings rotatable with said sun and ring gears respectively, and means also rotatable with said gears including hydraulic cylinder and piston means arranged coaxially with said clutch rings, means for constantly venting fluid from said cylinder means for disengaging said clutch mechanism, and means for supplying fluid to said cylinder means at a rate of flow greater than the flow through said venting means for engaging said clutch mechanism.

2. In a power transmission, a casing, concentric driving and driven shafts, a sun gear fixed to said driven shaft, flexible coupling means including resiliently connected coupling elements, one of which is fixed to said driving shaft, a planetary pinion carrier rotatable about the axis of said driven shaft and connected to the other of said coupling elements, said carrier having pinions rotatably mounted thereon and meshing with said sun gear, an intermediate member rotatable about the axis of said driven shaft having internal teeth meshing with said pinions and also having external teeth, a disc clutch having alternate discs thereof carried by and rotatable with said sun gear and said ring gear respectively, a brake having a plurality of discs thereof carried by and rotatable with said intermediate member and having cooperating alternate discs fixed to said casing, hydraulic means for selectively controlling the engagement and disengagement of said clutch and said brake, and means controlled by a reversal in the torque wind-up of said coupling elements for effecting disengagement of said clutch and brake, whichever may be engaged, to disconnect the drive between said shafts.

3. In a power transmission, a casing, concentric driving and driven shafts, a sun gear fixed to said driven shaft, flexible coupling means including resiliently connected coupling elements, one of which is fixed to said driving shaft, a planetary pinion carrier rotatable about the axis of said driven shaft and connected to the other of said coupling elements, said carrier having pinions rotatably mounted thereon and meshing with said sun gear, an intermediate member rotatable about the axis of said driven shaft having internal teeth meshing with said pinions and also having external teeth, a disc clutch having alternate annular discs thereof carried by and rotatable with said sun gear and said ring gear respectively, a brake having a plurality of annular discs thereof carried by and rotatable with said intermediate member and having cooperating alternate discs fixed to said casing, and hydraulic means for selectively controlling the engagement and disengagement of said clutch and said brake, said hydraulic means including stationary hydraulic cylinder and piston means for said brake and hydraulic cylinder and piston means for said clutch which are carried by and are rotatable with said intermediate member, each of said piston means having a plurality of peripherally spaced disc engaging abutments and resilient means constantly biasing said piston means in a direction to disengage its associated discs, means for constantly venting said cylinder means, and means for selectively admitting fluid thereto at a rate of flow greater than the flow through said venting means to effect engagement of said clutch and said brake.

4. In a power transmission, a casing, inner and outer concentric driving and driven shafts mounted in said casing, flexible coupling means including resiliently connected coupling elements, one of which is fixed to said inner shaft, a planetary pinion carrier rotatable about the axis of said shafts and connected to said other coupling element and having a plurality of planet pinions thereon, a sun gear fixed to said outer shaft and meshing with said pinions, an intermediate member freely rotatably mounted on said outer shaft having an internally toothed ring gear meshing with said planetary pinions and also having external gear teeth thereon, an internally toothed member carried by said casing, a ring-disc clutch releasably connecting said sun gear and ring gear for effecting rotation thereof with said planet gears as a unit, a ring-disc brake releasably connecting said internally toothed casing member with the externally toothed portion of said intermediate member, and hydraulic means for selectively controlling the engagement and disengagement of said clutch and said brake.

5. In a power transmission mechanism, for aircraft, an inner engine driven shaft, an outer propeller driving shaft concentric therewith, means operatively connecting said shafts including a coupling having resiliently connected members, one of which is fixed to said inner shaft, and change-speed gearing having elements thereof connected to the other coupling element and to the outer shaft respectively, said gearing including clutch mechanism for controlling the same, and means operative upon a reversal of wind-up of said flexibly connected coupling members for actuating said clutch mechanism to disconnect the drive between said shafts.

6. Power transmission mechanism for connecting each of a plurality of engines to a system of interconnected propellers, said transmission mechanism comprising, an engine driven shaft, a propeller driving shaft, coupling means operatively connecting said shafts having resiliently connected members, one of which is fixed to said engine driven shaft, and clutch mechanism having elements thereof operatively connected to the other coupling member and to the propeller driving shaft respectively, and means automatically operative upon a reversal of wind-up of said flexibly connected coupling members for actuating said clutch mechanism to disconnect said shafts.

7. Power transmission mechanism for connecting each of a plurality of engines to a system of interconnecting propellers, said transmission mechanism comprising, an engine driven shaft, a propeller driving shaft, coupling means operatively connecting said shafts having resiliently connected members, one of which is fixed to said engine driven shaft, and change-speed gearing having elements thereof operatively connected to the other coupling member and to the propeller driving shaft respectively, said gearing including clutch mechanism for connecting said shafts in different drive ratios and for disconnecting the same, manually operative means movable into different positions for controlling said clutch mechanism to connect said shafts in different drive ratios, and means operative automatically upon a reversal of wind-up of said flexibly connected members for actuating said clutch mechanism to disconnect said shafts in any drive ratio position of said manually operative means.

8. In an airplane, two fore and aft directed propeller drive shafts, each having an angle-drive gear box at its aft end, two engines mounted on opposite sides of the fore and aft centerline of the airplane, transmission means associated with each engine, each of said transmission means including concentric driving and driven shafts and coupling means operatively connecting adjacent ends of said shafts including flexible connected coupling members, means connecting the transmission means of each engine with a propeller drive shaft including a shaft extended transversely from said transmission at a point between said coupling means and the engine to the angle-drive gear box of the adjacent drive shaft, and means interconnecting the transmission means of said engines including a transverse shaft capable of transmitting the power from either engine to the transmission means associated with the other engine.

9. In an airplane, propeller driving means including two fore and aft directed propeller drive shafts, each having an angle-drive gear box, two engines mounted on opposite sides of the fore and aft centerline of the airplane between said drive shafts, transmission means associated with each engine, each of said transmission means including inner and outer concentric driving and driven shafts, a coupling disposed at the ends of said shafts including flexibly connected elements, one of which is connected to said inner shaft, and change-speed gearing mounted on said shafts having elements thereof connected to the other of said coupling elements and to said outer shaft, means for connecting the transmission means of each engine with the adjacent angle-drive gear box including a driving shaft having a geared connection to said outer shaft at a point between said coupling and the engine, and means for interconnecting the transmission means of said engines including a shaft capable of transmitting the power from either engine to the transmission means associated with the other engine.

10. In an airplane, propeller driving means including two fore and aft directed propeller drive shafts, each having an angle-drive gear box at its aft end, two like rotating engines mounted on opposite sides of the fore and aft centerline of the airplane between the axes of said drive shafts, each having forwardly directed transmission means associated therewith including inner and outer concentric driving and driven shafts, a coupling disposed at the ends of said shafts including flexibly connected elements, one of which is connected to said inner shaft, and change-speed gearing mounted on said shafts having elements thereof connected to the other of said coupling elements and to said outer shaft, means for connecting the transmission means of each engine with the angle-drive gear box of the adjacent propeller drive shaft and with each other including shafts extending at right angles to said propeller drive shafts and said concentric shafts in substantially the same horizontal planes with the latter, the shafts between said engine transmission means and said angle-drive gear boxes having bevel gears on the ends thereof adjacent said transmission means, and the shaft between said transmissions having bevel gears confronting said first mentioned bevel gears, and bevel driving gears on the outer shaft of each transmission means meshing with the pairs of confronting bevel gears, one of said driving bevel gears being located aft of said right angle shafts and the other being located ahead of said shafts, whereby to oppositely rotate said propeller drive shafts.

11. In an airplane, propeller drive means including two laterally spaced fore and aft directed propeller drive shafts, each having an angle-drive gear box on the inboard end thereof, two engines mounted on opposite sides of the fore and aft centerline of the airplane, each having transmission means associated therewith having a driving connection to said gear boxes, said transmission means being operably interconnected and including inner and outer concentric driving and driven shafts, a coupling disposed at the ends of said concentric shafts including flexibly connected elements, one of which is connected to said inner shaft, change-speed gearing mounted on said shafts having elements thereof connected to the other of said coupling elements and to said outer shaft respectively, and a clutch and a brake controlling the driving connection between said concentric shafts, pilot operated means for selectively actuating the clutches and brakes of both transmissions either to vary the drive ratio of said transmissions or to disconnect both engines, and means operative automatically upon reversal of torque in the coupling of either transmission means for operating the clutch and brake of that transmission means to disconnect its engine from said propeller driving means.

12. In a power transmission mechanism, driving and driven members, a sun gear connected to one of said members, an internal ring gear rotatable about the axis of said sun gear, a planetary pinion meshing with said sun and ring gears, a carrier for said pinion connected to the other of said members, clutch means including cooperating friction clutch discs rotatable with said sun and ring gears respectively, means also rotatable with said dics including hydraulic cylinder and piston means arranged co-axially with said discs, means for constantly venting fluid from said cylinder means to disengage said clutch means, and means for supplying fluid to said cylinder means at a rate of flow greater than the flow through said venting means for engaging said clutch means.

13. In a power transmission mechanism, driving and driven members, a sun gear connected to one of said members, an internal ring gear rotatable about the axis of said sun gear, a planetary pinion meshing with said sun and ring gears, a carrier for said pinion connected to the other of said members, clutch means including cooperating friction clutch discs rotatable with said sun and ring gears respectively, means also rotatable with said discs including hydraulic cylinder and piston means arranged co-axially with said discs, means for constantly venting fluid from said cylinder means for disengaging said clutch means, means for supplying fluid to said cylinder means at a rate of flow greater than the flow through said venting means for engaging said clutch means, and resilient means for constantly biasing said piston means into a clutch disengaging position.

14. In a power transmission mechanism, driving and driven members, means for connecting said members in different drive ratios including a sun gear connected to one of said members, an internal ring gear rotatable about the axis of said sun gear, a planetary pinion meshing with said sun and ring gears, a carrier for said pinion connected to the other of said members, clutch means for releasably connecting said sun and ring gears to effect rotation of the two as a unit including cooperating friction clutch discs rotatable with said sun and ring gears respectively, means also rotatable with said gears including hydraulic cylinder and piston means arranged co-axially with said discs, means for constantly venting fluid from said cylinder means for disengaging said clutch means, means for supplying fluid to said cylinder means at a rate of flow greater than the flow through said venting means for engaging said clutch means, brake means for releasably fixing said ring gear against rotation, and means for selectively operating said brake and clutch means.

CHARLES H. ZIMMERMAN.
HENRY J. RAPUANO.

REFERENCES CITED

The following references are of record in the file of this patent:

UNITED STATES PATENTS

| Number | Name | Date |
|---|---|---|
| Re. 15,550 | Zimmerman | Feb. 27, 1923 |
| 1,421,803 | Martin | July 4, 1922 |
| 1,707,877 | Roberts | Apr. 2, 1929 |
| 1,747,334 | Sundstedt | Feb. 18, 1930 |
| 2,069,408 | Forichon | Feb. 2, 1937 |
| 2,108,093 | Zimmerman | Feb. 15, 1938 |
| 2,251,625 | Hale | Aug. 5, 1941 |
| 2,319,169 | Tampier | May 11, 1943 |
| 2,340,571 | Sloane | Feb. 1, 1944 |
| 2,351,746 | Driehaus | June 20, 1944 |
| 2,377,457 | Stalker | June 15, 1945 |

FOREIGN PATENTS

| Number | Country | Date |
|---|---|---|
| 296,210 | Italy | May 11, 1932 |
| 369,498 | Italy | Mar. 21, 1939 |
| 375,986 | France | July 27, 1907 |
| 498,337 | France | Jan. 8, 1920 |
| 547,403 | Great Britain | Aug. 26, 1942 |
| 547,426 | Great Britain | Aug. 26, 1942 |